United States Patent Office 2,816,076
Patented Dec. 10, 1957

2,816,076

OIL-SOLUBLE SULFONATED HYDROCARBONS

Richard P. Neville, St. Louis, and John F. Palmer, Jr., Shrewsbury, Mo., assignors to Monsanto Chemical Company, St. Louis, Mo., a corporation of Delaware No Drawing. Application August 7, 1953,
Serial No. 373,046

5 Claims. (Cl. 252—48.2)

This invention relates to improvements in the preparation of oil-soluble sulfonated hydrocarbons, that is oil-soluble hydrocarbon sulfonic acids.

The problems in sulfonating hydrocarbons whether produced synthetically or obtained from natural sources in order to produce oil-soluble products has long vexed the art. For example, the sulfonation of petroleum oils is inefficient, difficult to control and provides a time-consuming and difficult by-product removal problem while in the sulfonation of the synthetic hydrocarbons such as the wax-alkylated aromatic hydrocarbons the quantity of sulfonating agent required is considerably in excess of theory and such provides for operational hazards, lessens the life of the equipment, presents a costly and time-consuming waste removal problem, and presents many other objectionable features. While many and varied suggestions have been made and tried to overcome these problems not one has been found entirely satisfactory.

In accordance with this invention, there is provided a process which substantially overcomes or reduces to a minimum these objectionable features and in particular provides for a highly desirable and much less expensive oil-soluble sulfonated hydrocarbon. To accomplish such there is added a petroleum oil to a mixture of a sulfonating agent and an oil-soluble sulfonated synthetic hydrocarbon under conditions which effect sulfonation of the petroleum oil. And most unexpectedly the total sulfonated hydrocarbon content obtained by the process of this invention is substantially greater than the sum total of the respective sulfonated hydrocarbons obtained separately.

In order to more fully describe this invention the following examples are given by way of illustration.

EXAMPLE A

*Synthetic hydrocarbon*

A paraffin wax having an average of about 23 carbon atoms in the molecule and an ASTM melting point of about 125–127° F. is chlorinated at about 80–85° C. with gaseous chlorine until the weight of the wax is increased to about 12%.

1000 parts by weight of the so prepared chlorowax is fed into a suitable reaction vessel containing a mixture of 201 parts by weight of benzene and about 36 parts by weight of aluminum chloride catalyst over a period of 3–4 hours at a temperature maintained at 35–50° C. Thereupon the temperature of the reaction mix is raised to 85–90° C. and is held there for 2 hours. The catalyst sludge is removed and the unreacted benzene and other contaminants are separated from the sludge-free liquid by steam distillation. The product obtained upon removing the residual water is substantially a diwax-alkylated benzene, possessing a specific gravity of 0.824, a kinematic viscosity at 210° F. of 7.00 centistokes, and an average molecular weight of 620 (i. e. an average composition of 620 parts per mole of benzene).

EXAMPLE B

*Sulfonated synthetic hydrocarbon*

To 620 parts by weight of the diwax-alkylated benzene of Example A is added with agitation over a 2.5 hour period approximately 320 parts by weight of oleum (25% free $SO_3$) while maintaining the temperature at 45–55° C. Upon completion of the acid addition, the mix is agitated for about 2 hours while maintaining the temperature at about 50–55° C. Thereupon sufficient water (about 41 parts by weight) to reduce the acid below sulfonating strength is added with agitation over a 15 minute period while permitting the temperature to rise to about 65° C. The mix is then stirred for about 5 minutes whereupon 620 parts by weight of a solvent refined Mid-Continent oil (sp. gr. at 60/60° F. 0.888; viscosity at 210° F., S. U. S.=38–40 sec.; flash point C. O. C. 380° F.; A. S. T. M. pour point +25° F.) is added rapidly and the mix so obtained stirred for about 30 minutes at 65–75° C. The reaction mix is then allowed to stand overnight. Thereupon the spent acid and sludge are drawn off from the oily organic layer, the sludge being then separated from the acid. The oily organic layer is aerated to remove the volatile materials and is then admixed with 5 times its volume of n-hexane, shaken up and then allowed to stand to permit settling. The liquid organic layer is then decanted. The residual sludge is recovered from the residual spent acid. The latter is combined with the original spent acid, weighed and assayed and the former is combined with the original sludge and weighed. The total yield of sludge, based upon the diwax-alkylated benzene charged is less than 1% by weight. The total yield of spent acid is 255 parts by weight, assaying 79.5% sulfuric acid. The decanted liquid organic layer is subjected to vacuum distillation at about 75° C. to remove the solvent. The yield of the petroleum oil solution of sulfonated diwax-alkylated benzene (i. e. diwax-alkylated benzene sulfonic acid) is 1330 parts by weight, which solution possesses an acidity as determined by electrometric titration of 1.52 ml. of 0.5 N NaOH per gram of solution. The molar yield of hydrocarbon monosulfonic acid (which in fact is diwax-alkylated benzene monosulfonic acid) based upon the diwax-alkylated benzene charged is 101% by weight.

The petroleum oil solution of the sulfonated hydrocarbon of Example B is heated to about 50° C. and thereto is added and intimately mixed 434 parts by weight of barium hydroxide octahydrate. Upon completion of the barium hydroxide addition the reaction mixture is heated to 80–90° C. and agitated at that temperature for about one hour. The mix is then heated to about 150° C. and the water distilled off under reduced pressure. The dehydrated mixture is then admixed with a small amount of diatomaceous earth and filtered through a press at 100–110° C. 1485 parts by weight of a clear solution of the basic barium salt of the hydrocarbon sulfonic acid assaying 9.76% by weight barium is obtained.

EXAMPLE C

*Sulfonated mixture of hydrocarbons of synthetic and natural origin*

To an intimate mixture of 620 parts by weight of the diwax-alkylated benzene of Example A and 1240 parts by weight of a solvent refined Mid-Continent oil (sp. gr. 0.888; viscosity at 210° F., S. U. S.=38–40 sec.; flash point C. O. C. 380° F.; A. S. T. M. pour point +25° F.) is added with agitation over a 2.5 hour period approximately 320 parts by weight of oleum (25% free $SO_3$) while maintaining the temperature at 45–55° C. Upon completion of the acid addition the mix is agitated for about 4 hours while maintaining the temperature at about 50–55° C. Thereupon sufficient water (about 41 parts by weight) to reduce the acid below sulfonating strength is added with agitation over a 15 minute period while permitting the temperature to rise to about 65° C. The mix is then stirred for about 5 minutes. The reaction mix is then allowed to stand overnight. Thereupon the spent acid and sludge are drawn off from the oily organic layer and then the sludge is separated from the spent acid. The yield of sludge is 555 parts by weight, which based upon the diwax-alkylated benzene charged is 89.5%. The yield of spent acid is 17 parts by weight, assaying 72.4% sulfuric acid. The oily layer is aerated to remove the volatile materials. The yield of the petroleum oil solution of the sulfonated hydrocarbon (i. e. hydrocarbon sulfonic acid) is 1625 parts by weight, which solution possesses an acidity as determined by electrometric titration of 0.36 ml. of 0.5 N NaOH per gram of solution. The molar yield of hydrocarbon monosulfonic acid based upon the diwax-alkylated benzene charged is 36% by weight.

The petroleum oil solution of the sulfonated hydrocarbon of Example C is heated to about 50° C. and thereto is added and intimately mixed 367 parts by weight of barium hydroxide octahydrate. Upon completion of the barium hydroxide addition the reaction mixture is heated to 80–90° C. and agitated at that temperature for about one hour. The mix is then heated to about 150° C. and the water distilled off under reduced pressure. The dehydrated mixture is then admixed with a small amount of diatomaceous earth and filtered through a press at 100–110° C. 1670 parts by weight of a clear solution of the basic barium salt of the hydrocarbon sulfonic acid assaying 2.79% barium is obtained.

EXAMPLE D

*Sulfonated petroleum oil*

To 600 parts by weight of a solvent refined Mid-Continent oil (sp. gr. at 60/60° F. 0.888; viscosity at 210° F., S. U. S.=38–40 sec.; flash point C. O. C. 380° F.; A. S. T. M. pour point +25° F.) is added with agitation over a one hour period approximately 45 parts by weight of oleum (17% free $SO_3$) while maintaining the temperature at 28–35° C. Upon completion of the acid addition, the mixture is agitated for about 2 hours while maintaining the temperature at 28–35° C. The reaction mix is then allowed to stand overnight. No liquid spent acid layer separates. The separated sludge (approximately 84 parts by weight) is withdrawn from the oily organic layer. The yield of the petroleum oil solution of sulfonated hydrocarbon is 560 parts by weight. The molar yield of hydrocarbon monosulfonic acid based on the assumption the average molecular weight of the petroleum oil charged is the same as that of the diwax-alkylated benzene of Example A is 2.2% by weight.

To the petroleum oil solution of sulfonated hydrocarbon of Example D is added with agitation over a 2 hour period approximately 135 parts by weight of oleum (17% free $SO_3$) while maintaining the temperature at 30–40° C. Upon completion of the acid addition, the mixture is agitated for about 2 hours at 40–50° C. Thereupon sufficient water (about 27 parts by weight) to reduce the acid below sulfonating strength is added over a 15 minute period while permitting the temperature to rise to about 60° C. The mix is then stirred for about five minutes and then allowed to stand overnight. Thereupon the spent acid and sludge are drawn off from the oily organic layer, the sludge being then separated from the spent acid. The yield of sludge is 268 parts by weight and the yield of spent acid is 2.2 parts by weight. The yield of the petroleum oil solution of sulfonated hydrocarbon is 450 parts by weight. The molar yield of hydrocarbon monosulfonic acid based on the assumption the average molecular weight of the petroleum oil charged is the same as that of the diwax-alkylated benzene of Example A is 6.5% by weight.

EXAMPLE I

To 620 parts by weight of the diwax-alkylated benzene of Example A is added with agitation over a 2.5 hour period approximately 320 parts by weight of oleum (25% free $SO_3$) while maintaining the temperature at 45–55° C. Upon completion of the acid addition the mix is agitated for about 2 hours while maintaining the temperature at about 50–55° C. Thereupon 620 parts by weight of a solvent refined Mid-Continent oil (sp. gr. 0.888; viscosity at 210° F. S. U. S.=38–40 sec.; flash point C. O. C. 380° F.; A. S. T. M. pour point +25° C.) is added rapidly and the mix so obtained is agitated at 50–55° C. for about 2 hours. Thereupon sufficient water (about 41 parts by weight) to reduce the acid below sulfonating strength is added with agitation while permitting the temperature to rise to about 65° C. The mix is then stirred for about 5 minutes. The reaction mix is then allowed to stand overnight. Thereupon the spent acid and sludge are drawn off from the oily organic layer, the sludge being then separated from the acid. The oily organic layer is then aerated to remove the volatile materials and is then admixed with 5 times its volume of n-hexane, shaken up and then allowed to stand to permit settling. The liquid organic layer is then decanted leaving a small residue of sludge and spent acid. The residual sludge is recovered from the residual spent acid. The latter is combined with the original spent acid, weighed and assayed and the former is combined with the original sludge and weighed. The total yield of sludge is 23 parts by weight, which based upon the diwax-alkylated benzene charged is 3.7% by weight. The total yield of spent acid is 214 parts by weight, assaying 73.9% sulfuric acid. The decanted liquid organic layer is subjected to vacuum distillation at about 75° C. to remove the solvent. The weight yield of the petroleum oil solution of sulfonated hydrocarbon (i. e. hydrocarbon sulfonic acid) is 1335 parts by weight which solution possesses an acidity as determined by electrometric titration of 2.07 ml. of 0.5 N NaOH per gram of solution. The molar yield of hydrocarbon monosulfonic acid based upon the diwax-alkylated benzene charged is 138% by weight.

The petroleum oil solution of the sulfonated hydrocarbon of Example I is heated to about 50° C. and thereto is added and intimately mixed 436 parts by weight of barium hydroxide octahydrate. Upon completion of the barium hydroxide addition the reaction mixture is heated to 80–90° C. and agitated at that temperature for about one hour. The mix is then heated to 150° C. and the water distilled off under reduced pressure. The dehydrated mixture is then admixed with a small amount of diatomaceous earth and filtered through a press at 100–110° C. 1545 parts by weight of a clear solution of the basic barium salt of the hydrocarbon sulfonic acid assaying 12.96% barium is obtained.

EXAMPLE II

To 620 parts by weight of the diwax-alkylated benzene of Example A is added with agitation over a 3 hour period approximately 400 parts by weight of oleum (25% free $SO_3$) while maintaining the temperature at 45–55° C. Upon completion of the acid addition the mix is agitated for about 2 hours while maintaining the temperature at about 50–55° C. Thereupon 1240 parts by weight of a solvent refined Mid-Continent oil (sp. gr. 0.888; viscosity at 210° F., S. U. S.=38–40 sec.; flash point C. O. C. 380° F.; A. S. T. M. pour point +25° C.) is added rapidly and the mix so obtained is agitated at 50–55° C. for about 2 hours. Thereupon sufficient water (about 67 parts by weight) to reduce the acid below sulfonating strength is added with agitation while permitting the temperature to rise to about 65° C. The mix is then stirred for about 5 minutes. The reaction mix is then allowed to stand overnight. Thereupon the spent acid and sludge are drawn off from the oily organic layer, the sludge being then separated from the acid. The oily organic layer is then aerated to remove the volatile materials and is then admixed with 3 times its volume of n-hexane, shaken up and then allowed to stand. The yield of sludge is 53.5 parts by weight, which based upon the diwax-alkylated benzene charged is 8.6% by weight. The total yield of spent acid is 277 parts by weight, assaying 72.0%. The n-hexane solution of the oily organic layer is subjected to vacuum distillation at about 75° C. to remove the solvent. The weight yield of the petroleum oil solution of the sulfonated hydrocarbon (i. e. hydrocarbon sulfonic acid) is 1930 parts by weight which solution possesses an acidity as determined by electrometric titration of 1.74 ml. of 0.5 N NaOH per gram of solution. The molar yield of hydrocarbon monosulfonic acid based on the diwax-alkylated benzene charged is 168% by weight.

The petroleum oil solution of the sulfonated hydrocarbon of Example II is heated to about 50° C. and thereto is added and intimately mixed 555 parts by weight of barium hydroxide octahydrate. Upon completion of the barium hydroxide addition the reaction mixture is heated to 80–90° C. and agitated at that temperature for about one hour. The mix is then heated to 150° C. and the water distilled off under reduced pressure. The dehydrated mixture is then admixed with a small amount of diatomaceous earth and filtered through a press at 100–110° C. 2190 parts by weight of a clear solution of basic barium salt of a hydrocarbon sulfonic acid assaying 11.05% barium is obtained.

The following table summarizes the results of foregoing Examples B, C, I and II:

TABLE

| Example | B | C | I | II |
|---|---|---|---|---|
| Diwax-alkylated benzene [1] | 620 | 620 | 620 | 620 |
| Petroleum oil [1] | 620 | 1,240 | 620 | 1,240 |
| Sulfonated hydrocarbon (i. e. petroleum oil solution of) [1] | 1,330 | 1,625 | 1,335 | 1,930 |
| Molar weight percent yield of monosulfonated hydrocarbon based on diwax-alkylated benzene | 101 | 36 | 138 | 168 |
| Spent acid [1] | 225 | 17 | 214 | 277 |
| Assay of spent acid as $H_2SO_4$ in percent | 79.5 | 72.4 | 73.9 | 72.0 |
| Sludge [1] | (2) | 555 | 23 | 53.5 |
| Basic barium salt of sulfonated hydrocarbon (i. e. petroleum oil solution of) [1] of Example | 1,485 | 1,670 | 1,545 | 2,190 |
| Assay of barium content in percent | 9.76 | 2.79 | 12.96 | 11.05 |

[1] Parts by weight.
[2] Weight of sludge was less than 1% by weight based upon the diwax-alkylated benzene charged (620 parts by weight).

The sulfonated hydrocarbons produced in accordance with the process of this invention provide for highly useful and economical detergent-dispersants for lubricating oil compositions. As illustrative thereof the basic barium salt of a sulfonated hydrocarbon prepared in accordance with the process of this invention and the basic barium salt of a sulfonated synthetic hydrocarbon were compared in the following lubricating oil compositions, which compositions respectively contain 0.105% by weight barium, employing the Coordinating Research Conference L-1-545 test and found to have the same detergent-dispersant properties.

|  | M | N |
|---|---|---|
|  | (parts by weight) | |
| Mineral oil of lubricating viscosity | 98.05 | 98.18 |
| Commercial mixture of oxidation inhibitors | 0.87 | 0.87 |
| Petroleum oil solution of the basic barium salt of the sulfonated hydrocarbon of Example B (Ba assay 9.76%) | 1.08 | |
| Petroleum oil solution of the basic barium salt of the sulfonated hydrocarbon of Example II (Ba assay 11.05%) | | 0.95 |

As further illustrative of the process of this invention is the following:

EXAMPLE III

To 620 parts by weight of the diwax-alkylated benzene of Example A is added with agitation over a 2.5-hour period approximately 320 parts by weight of oleum (25% free $SO_3$) while maintaining the temperature at 45–55° C. Upon completion of the acid addition the mix is agitated for about 2 hours while maintaining the temperature at about 50–55° C. Thereupon 620 parts by weight of a blended East Texas heavy neutral distillate oil (sp. gr. at 60/60° F. 0.888; viscosity at 210° F., S. U. S.=62.3 sec.; A. S. T. M. pour point +25° F., flash point C. O. C.=450° F) is added rapidly and the mix so obtained is agitated at 50–55° C. for about 2 hours. Thereafter sufficient water (about 41 parts by weight) to reduce the acid below sulfonating strength is added with agitation while permitting the temperature to rise to about 65° C. The mix is then stirred for about 5 minutes. The reaction mix is then allowed to stand overnight. Thereupon the spent acid and sludge are drawn off from the oily organic layer, the sludge being then separated from the acid. The oily organic layer is then aerated to remove the volatile materials and is then admixed with 5 times its volume of n-hexane, shaken up and allowed to stand to permit settling. The organic layer is then decanted. The residual sludge is recovered from the residual spent acid. The latter is combined with the original spent acid, weighed and assayed and the former is combined with the original sludge and weighed. The total yield of sludge is 13.6 parts by weight, which based upon the diwax-alkylated benzene charged is 2.2%. The total yield of spent acid is 231 parts by weight, assaying 75.6% sulfuric acid. The decanted organic layer is subjected to vacuum distillation at about 75° C. to remove the solvent. The yield of the petroleum oil solution of sulfonated hydrocarbon (i. e. hydrocarbon sulfonic acid) is 1340 parts by weight which solution possesses an acidity as determined by electrometric titration of 1.76 ml. of 0.5 N NaOH per gram of solution. The molar yield of hydrocarbon monosulfonic acid based upon the diwax-alkylated benzene charged is 118% by weight.

600 parts by weight of the blended East Texas heavy neutral distilled oil of Example III upon being sulfonated in accordance with the process of Example D yielded 109 parts by weight of sludge and with respect to the hydrocarbon mono-sulfonic acid realized a molar yield of 5.1% by weight based upon the assumption the average molecular weight of the oil is the same as that of the diwax-alkylated benzene of Example A.

EXAMPLE IV

To 620 parts by weight of the diwax-alkylated benzene of Example A is added with agitation over a 2 hour period approximately 401 parts by weight of oleum (25% free $SO_3$) while maintaining the temperature at 45–55° C. Upon completion of the acid addition 1240 parts by weight of an East Texas heavy waxy neutral oil (A. P. I. gravity=26.9–27.3; viscosity at 210° F. S. U. S.=66.8–73.5 sec.; flash point C. O. C.=495–505° F.; A. S. T. M. pour point +20° F.) is added rapidly and the mix so obtained is agitated at 50–55° C. for about 1 hour. Thereupon sufficient water (about 62 parts by weight) to reduce the acid below sulfonating strength is added with agitation while permitting the temperature to rise to about 65° C. The mix is then stirred for about 5 minutes. The reaction mix is then allowed to stand. Thereupon the spent acid and sludge are drawn off from the oily organic layer, the sludge (approximately 15 parts by weight) being then separated from the acid. The oily organic layer is then aerated to remove the volatile materials and is then centrifuged to remove any residual sludge and/or spent acid. The yield of the petroleum oil solution of sulfonated hydro-

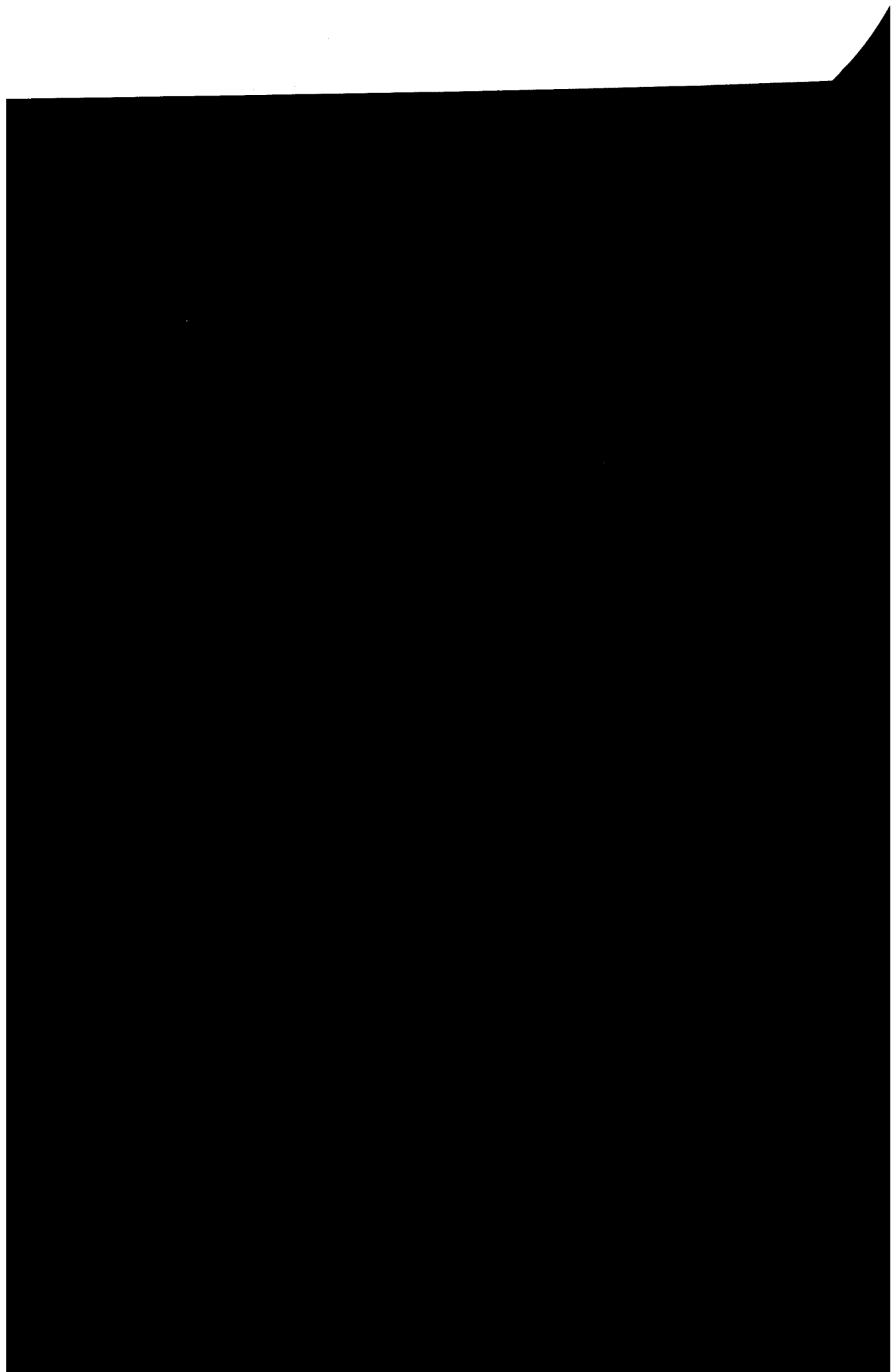

of 90% sulfuric acid to that of oleum containing 60% by weight sulfur trioxide, the weight ratio of petroleum oil and sulfonated synthetic hydrocarbon being approximately 0.5 to 4 parts of the former to one part of the latter.

3. In the method of making oil-soluble sulfonated hydrocarbons the step which comprises admixing at a sulfonating temperature in the range of about 40° C. to about 60° C. a petroleum oil with a mixture of a sulfuric acid sulfonating agent of sulfonating strength with respect to the petroleum oil and a sulfonated synthetic hydrocarbon of the formula R—SO$_3$H where R is a diwax-alkylated benzene radical wherein the wax-alkyl substituents contain from 20 to 30 carbon atoms respectively, the sulfuric acid concentration of said sulfonating agent being in the range of 90% sulfuric acid to that of oleum containing 60% by weight sulfur trioxide, the weight ratio of petroleum oil and sulfonated synthetic hydrocarbon being approximately 0.5 to 4 parts of the former to one part of the latter.

4. The method of making oil-soluble sulfonated hydrocarbons which comprises adding to a crude mixture of a sulfonating agent for petroleum oil and a substantially mono-sulfonated wax-alkylated benzenoid hydrocarbon, which crude mixture is obtained by sulfonating a wax-alkylated benzene with oleum containing about 10–35 percent by weight free sulfur trioxide in an amount in the range of from about 1.2 to about 1.3 mols SO$_3$ per mol of benzene of the wax-alkylated benzene hydrocarbon, approximately 0.5 to about 4 parts by weight of a petroleum oil per part of wax-alkylated benzene, and sulfonating the petroleum oil of said mixture at a temperature in the range of about 40° C. to about 60° C.

5. The process of claim 4 wherein the wax-alkylated benzene is a diwax-alkylated benzene wherein the wax-alkyl substituents contain from 20 to 30 carbon atoms.

References Cited in the file of this patent

UNITED STATES PATENTS

| | | |
|---|---|---|
| 2,197,835 | Reiff | Apr. 23, 1940 |
| 2,529,538 | Henry | Nov. 14, 1950 |
| 2,529,539 | Brod | Nov. 14, 1950 |
| 2,532,997 | Cohen | Dec. 5, 1950 |